(12) United States Patent
Hirota (10) Patent No.: US 6,351,959 B1
(45) Date of Patent: Mar. 5, 2002

(54) REFRIGERATING CYCLE WITH A BY-PASS LINE

(75) Inventor: Hisatoshi Hirota, Tokyo (JP)

(73) Assignee: TGK Co. Ltd., Tokyo (JP)

( * ) Notice: Subject to any disclaimer, the term of this patent is extended or adjusted under 35 U.S.C. 154(b) by 0 days.

(21) Appl. No.: 09/516,525

(22) Filed: Mar. 1, 2000

(30) Foreign Application Priority Data

Mar. 25, 1999 (JP) .......................................... 11-081246

(51) Int. Cl.[7] ............................................... F25B 41/04
(52) U.S. Cl. ........................................... 62/198; 62/217
(58) Field of Search ........................... 62/198, 217, 278

(56) References Cited

U.S. PATENT DOCUMENTS

| | | | | |
|---|---|---|---|---|
| 3,365,905 A | * | 1/1968 | Barbier | 62/217 |
| 3,435,626 A | * | 4/1969 | Wile et al. | 62/217 |
| 3,808,829 A | * | 5/1974 | Peruglia | 62/217 |
| 4,442,680 A | * | 4/1984 | Barbier et al. | 62/217 |
| 4,619,115 A | * | 10/1986 | Weber | 62/217 |
| 4,893,748 A | | 1/1990 | Balducci | 237/4 |
| 4,934,156 A | * | 6/1990 | Barbier | 62/217 |
| 5,291,941 A | | 3/1994 | Enomoto et al. | 165/62 |
| 5,743,098 A | * | 4/1998 | Behr | 62/217 |
| 5,755,106 A | * | 5/1998 | Ross | 62/217 |
| 6,148,632 A | * | 11/2000 | Kishita et al. | 62/217 |

FOREIGN PATENT DOCUMENTS

| | | |
|---|---|---|
| EP | 0 895 884 | 2/1999 |
| EP | 0 916 914 | 5/1999 |
| FR | 2 720 982 | 12/1995 |

\* cited by examiner

*Primary Examiner*—William E. Tapolcai
(74) *Attorney, Agent, or Firm*—Nilles & Nilles SC (57) ABSTRACT

In a refrigerating cycle with a by-pass line 5 detouring the condenser 2 in an auxiliary heating mode the amount of circulated refrigerant is controlled in accordance with load, etc. so that the heating can be suited to such conditions. A regulator 20 for controlling the outlet pressure of the evaporator to a fixed level allows to use an evaporator 4 having ordinary pressure resistance. An accumulator 6 for temporarily storing low-pressure refrigerant liquid is provided between the outlet of evaporator 4 and a compressor 1. In an auxiliary heating mode the amount of the circulated refrigerant passing the by-pass line 5 is controlled by the accumulator 6. Simultaneously the regulator is controlling the outlet pressure of the evaporator to an essentially fixed level.

12 Claims, 12 Drawing Sheets

REFRIGERATING CYCLE WITH A BY-PASS LINE

BACKGROUND OF THE INVENTION

1. Field of the Invention

This invention relates to a refrigerating cycle, having a main line and a by-pass line, a compressor, a condenser in said main line downstream the compressor, an evaporator downstream said condenser, an accumulator between said evaporator and said compressor, at least one expansion valve means for adiabatically expanding a refrigerant, and refrigerant flow switching means for selectively supplying the refrigerant in a cooling mode to said condenser and in a heating mode to said by-pass line. The evaporator usually used for cooling purposes, on demand can be used for auxiliary heating instead.

In air conditioning systems for automobiles, an ordinary refrigerating cycle is used for cooling, while heated engine cooling water is used for heating purposes. However, with high-efficiency engines such as recently developed direct gasoline injection type engines, the heat content of the cooling water is far less than with conventional combustion engines, leading to the drawback that the heat content does suffice sufficiently for heating purposes, e.g. in wintertime.

2. Description of the Related Art

Figure 12:
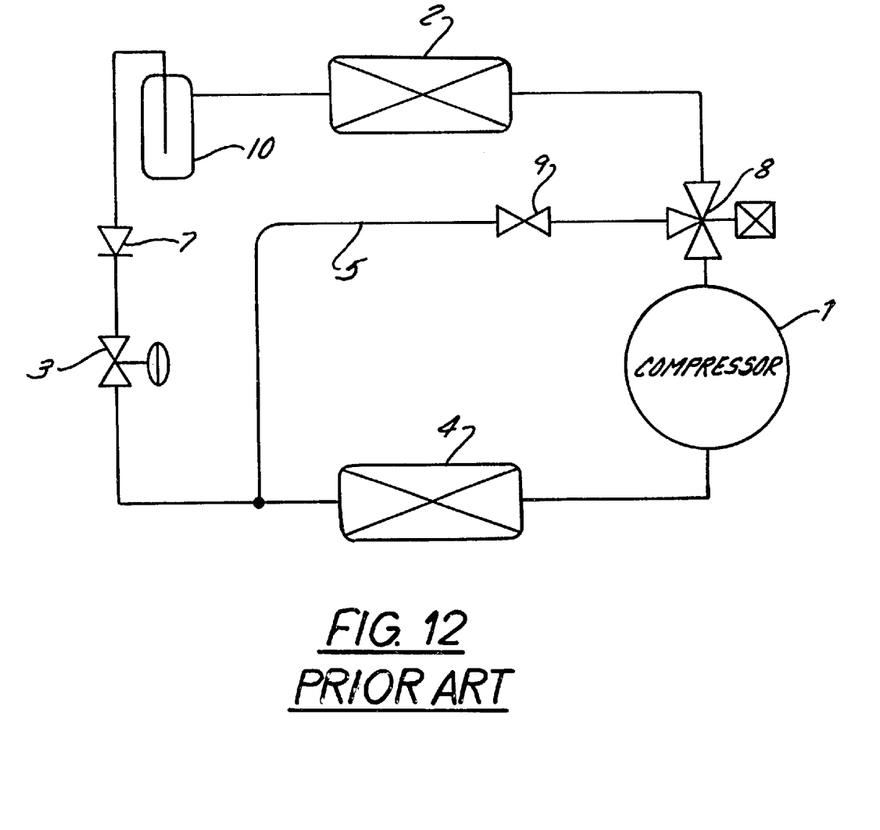

A known refrigerating cycle (U.S. Pat. No. 4,893,748), and as shown in FIG. 12, comprises a by-pass line 5 for high-pressure refrigerant gas discharged from a compressor 1 to flow into an evaporator 4 arranged inside a vehicle compartment but without passing through a condenser 2 arranged outside the compartment, so that a sensitive or sufficient amount of heat may be removed in the process of heat exchange by the evaporator 4 to be used for auxiliary heating. Said known refrigerating cycle comprises an expansion valve 3, a liquid tank for temporarily storing high-pressure refrigerant liquid, a check valve 7, a line switching valve 8 for directing the high-pressure refrigerant from the compressor 1 to the condenser 2 or the by-pass line 5, and a constant-differential-pressure regulating valve 9 acting as an expansion valve in the heating mode when the refrigerant is passing the by-pass line 5. Since in the known refrigerating cycle the refrigerant does not pass the liquid tank 10 in an auxiliary heating mode only a fixed amount of refrigerant is circulating in the heating mode. Consequently, the amount of the refrigerant cannot be controlled in accordance with load, etc. It is impossible to adapt the heating to such conditions. Furthermore, in case of high speed of the compressor 1 high pressure is acting in evaporator 4. As a consequence, it is necessary to have an evaporator 4 with increased pressure resistance resulting in extremely high manufacturing costs.

Further prior art is contained in U.S. Pat. No. 5,291,941, FR 27 20 982 A, FIG. 1, EP 0 895 884 A and in EP 0 916 914 A having an earlier time ranking.

It is an object of the invention to provide a refrigerating cycle of the kind as disclosed which allows to suitably adapt the heating function in the auxiliary heating mode to actual conditions and which leads to fair production and manufacturing costs. In particular, the refrigerating cycle should allow to control the amount of the circulating refrigerant in accordance with load, etc. and to eliminate the need to increase the pressure resistance of the evaporator for the auxiliary heating mode.

Said object is achieved by the refrigerating cycle according to the invention and with the feature combination contained in claim 1.

When the refrigerant is circulating through the by-pass line without passing through the condenser (auxiliary heating mode), the flow rate of the refrigerant is controlled by the accumulator such that the amount of the circulated refrigerant is controlled in accordance with load, etc. It is thus possible to provide heating suited to such conditions. The regulator controls the outlet pressure of the evaporator such that the refrigerant temperature can be maintained to ensure the heating capacity. The evaporator does not need to have an increased pressure resistance. This allows to construct and manufacture the refrigerating cycle at ordinary costs.

Small fluctuations of the outlet pressure of the evaporator or the inlet pressure of the regulator can be tolerated for a proper operation of the refrigerating cycle. This is achieved by keeping the inlet pressure at a fixed pressure value or higher or at a fixed pressure value or lower.

A regulator having a pressure limiting main valve responsive to the value of the inlet pressure and/or the outlet pressure of the evaporator limits the outlet pressure of the evaporator to a fixed level or around a fixed level. This can be made by either limiting the minimum pressure value and allowing smaller pressure variations to a higher pressure value or by limiting the maximum pressure and allowing smaller variations of the pressure to a lower pressure value. In any case, an ordinary design of the evaporator without increased pressure resistance can be used. The tolerated pressure variations, above the minimum pressure value or below the maximum pressure value are automatically controlled in the heating mode by the pressure controlling characteristic of said pressure limiting main valve.

A pressure range of about 0.2 to 1.5%, preferably about 0.4 to 1.0% above said minimum or below said maximum pressure value, respectively, are tolerable and will not cause undesirable high pressure load for the evaporator during the heating mode.

The actual prevailing outlet pressure of the evaporator is controlled by motions of the pressure limiting main valve between its open and closed states and by the natural throttling resistance in the fully opened valve. The control characteristics of the pressure limiting main valve depend mainly on the spring assembly used to bias the valve in closing direction. The pre-load of said spring assembly can be adjusted on demand. The diaphragm does not only transmit the force of the pressure uniformly onto the spring assembly but additionally seals the spring assembly and protects it from contact with the refrigerant. Preferably, said spring assembly is designed for a relatively long opening stroke of the valve with a relatively constant spring behaviour.

In order to avoid unstable operating conditions a leak passage with a small cross-sectional area in comparison with the cross-sectional area of the refrigerant line is detouring the regulator and directly interconnects the evaporator and the accumulator. Even in the fully closed state of the regulator the leak passage allows a delayed pressure exchange and a minimum refrigerant flow. In order to avoid an undesired influence of the regulator on the cooling mode an on-off valve allows to by-pass the regulator. Preferably, said on-off valve is a actuated corresponding with the refrigerant flow switching means when switching the refrigerating cycle into the cooling mode or into the auxiliary heating mode. For manufacturing purposes and in order to save mounting space the regulator and the on-off valve structurally can be united in a common valve block.

It can be particularly expedient to provide the regulator between a pressure control chamber and an outlet of the on-off valve, if the on-off valve is designed as a pilot-operated electromagnetic valve.

BRIEF DESCRIPTION OF THE DRAWINGS

Embodiments of the invention will be described with the help of the drawings among which FIG. 12 is showing a conventional refrigerating cycle. In the drawings is:

DESCRIPTION OF THE PREFERRED EMBODIMENTS

Figure 1:
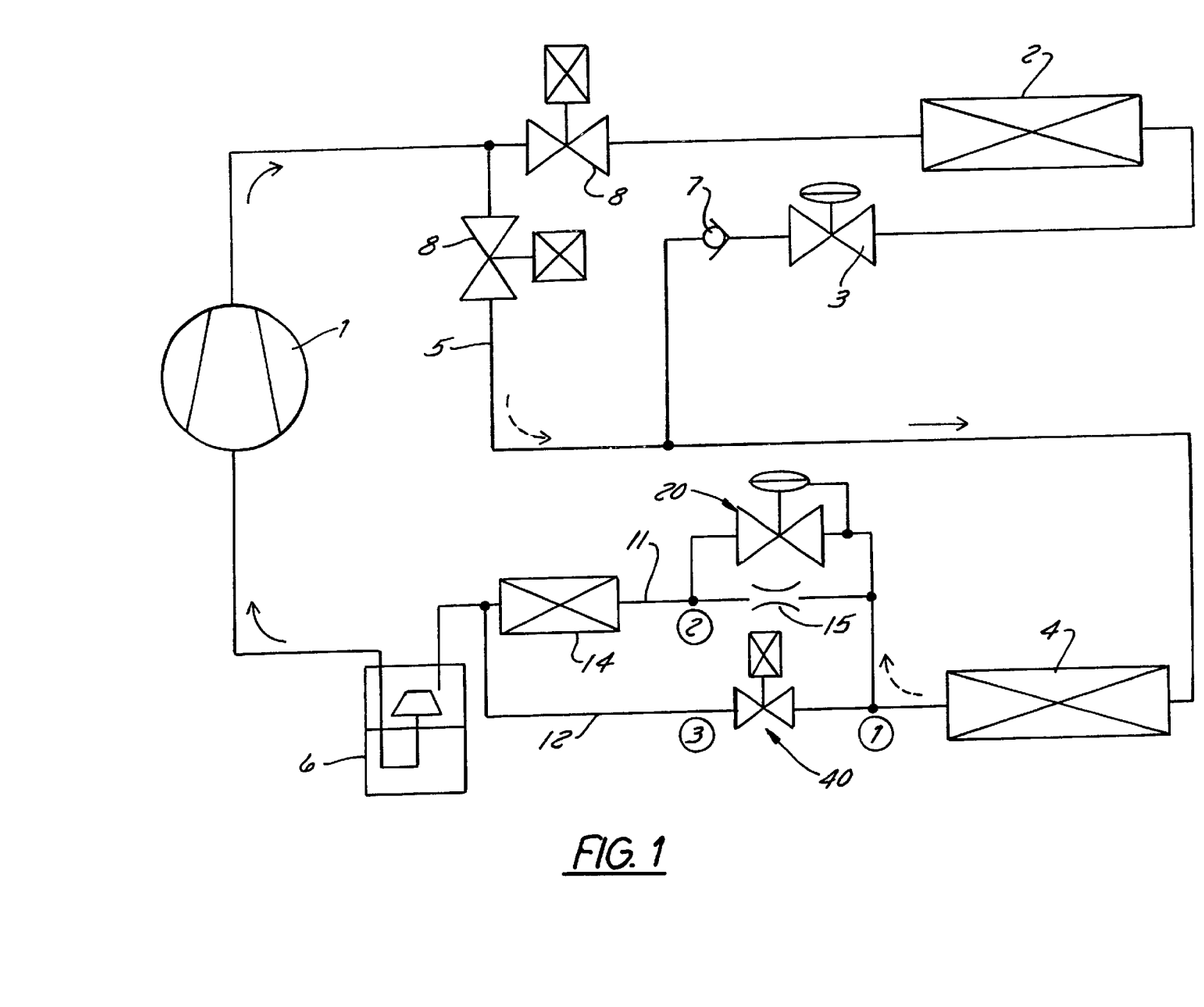
FIG. 1 a schematic block diagram of a first embodiment of a refrigerating cycle, FIG. 2 a sectional view of a regulator section of the refrigerating cycle of FIG. 1 is fully closed state, FIG. 3 a sectional view of the regulator section in a fully opened state, FIG. 4 a sectional view of an electromagnetic on-off valve section of the refrigerating cycle of FIG. 1, in a closed state, FIG. 5 the electromagnetic on-off valve section of FIG. 4 in an open state, FIGS. 6, 7 and 8 sectional views of the regulator in its closed state having differently designed spring assemblies, FIG. 9 a sectional view of the regulator section in a modified form, FIG. 10 a schematic block diagram of a second embodiment of a refrigerating cycle, FIG. 11 a sectional view of regulator and on-off valve sections of the refrigerating cycle of FIG. 11, and FIG. 12 a schematic block diagram of a conventional refrigerating cycle.

As in the conventional refrigerating cycle of FIG. 12 the refrigerating cycle in the first embodiment of the invention in FIG. 1 comprises a compressor 1, a condenser 2, arranged outside a vehicle compartment, e.g. of an automobile having an airconditioning system, an expansion valve 3, an evaporator 4, arranged at an air duct leading to the interior of the vehicle compartment, and an accumulator 6 for temporarily storing low-pressure refrigerant.

In addition to a main refrigerating line interconnecting the above-mentioned components and to enable auxiliary heating by means of the evaporator 4 a by-pass line 5 is provided allowing to direct high-pressure refrigerant gas discharged from compressor 1 into the a evaporator 4 without passing through condenser 2. Upstream of by-pass line 5 a check valve 7 blocking in backflow direction is provided in the main refrigerant line. A line switching valve (three-way valve) 8 is provided for directing the high-pressure refrigerant from the compressor 1 either to the condenser 2 or to the by-pass line 5.

Along by-pass line 5 an expansion valve or the like can be provided. However, as shown, such an expansion valve can be omitted and/or its function can be performed by the line switching valve 8 itself. Furthermore, expansion valve 3 and check valve 7 can be provided in reversed order. In this case, expansion valve 3 may be a restricted flow passage with a restricted fixed cross-sectional area only. Instead of check valve 7 a valve can be provided having the function of a constant-differential-pressure regulating valve.

A heating-mode passage 11 and a cooling-mode passage 12 (by-pass passage) are connected in parallel between evaporator 4 and accumulator 6. For cooling-mode passage 12 an electromagnetic on-off valve 40 is provided which when opened during normal cooling mode directly supplies refrigerant from the evaporator 4 to the accumulator 6. During this mode the refrigerant is not passed through the by-pass line 5.

In heating-mode passage 11 a heat exchanger 14 can be provided for exchanging heat released from the engine, or motor, battery or the like, of the automobile, with the refrigerant. Heat transferred in heat exchanger 14 can also be employed for heating purposes by means of the evaporator 4 in the auxiliary heating mode.

In heating-mode passage 11 upstream of heat exchanger 14 a regulator 20 is provided. The regulator 20 serves to control the pressure of an inlet (the inlet of the regulator 20 itself) to or around a fixed level. By controlling the inlet pressure automatically the outlet pressure of the evaporator 4 can be controlled.

Specifically, regulator 20 closes when its inlet pressure is smaller than or equal to a minimum pressure value of e.g. 12 $kg/cm^2$. As the inlet pressure increases beyond 12 $kg/cm^2$, the opening of the regulator gradually is increased to a final full opening state with a pressure of 12.5 $kg/cm^2$, e.g. In this condition the heating-mode passage 11 is opened with a large cross-sectional area. Namely, when the inlet pressure of regulator 20 tends to drop below 12 $kg/cm^2$, the regulator 20 closes and blocks heating-mode passage 11 so that the refrigerant pressure is prevented from dropping below 12 $kg/cm^2$, thus maintaining the refrigerant temperature and ensuring the heating capacity.

Also, when the inlet pressure of regulator 20 begins to increase beyond 12 $kg/cm^2$, the regulator 20 will open the heating-mode passage 11 again. Consequently, the inlet pressure of the regulator 20 is prevented from exceeding, e.g. 12.5 $kg/cm^2$, and the pressure of the refrigerant passing through the evaporator 4 is restricted to this pressure value. This means automatically that the pressure resistance of the evaporator 4 can be set to an ordinary level.

The closing characteristics of regulator 20 instead can be selected as follows: As soon as the inlet pressure of regulator 20 is equal or lower than a minimum pressure value of e.g. 12 $kg/cm^2$ the regulator closes. When the inlet pressure is increasing beyond 12 $kg/cm^2$ the regulator 20 gradually increases its opening to a final full opening state so that in the initial opening phase the pressure might rise to 12.5 $kg/cm^2$ and subsequently again drop to e.g. 12 $kg/cm^2$ and will be held at this value as long as the inlet pressure does not drop further. In this condition a large cross-sectional area is open for the heating mode refrigerant flow. When the inlet pressure of regulator 20 tends to drop below 12 $kg/cm^2$ the regulator 20 closes and blocks the flow so that the refrigerant pressure is prevented from dropping below 12 $kg/cm^2$, thus maintaining the refrigerant temperature and ensuring the heating capacity needed. Again, as soon as the inlet pressure begins to rise beyond 12 $kg/cm^2$ and approaches e.g. 12.5 $kg/cm^2$ the regulator will open until, depending on the inlet pressure value, a fully opened state is achieved. Consequently, the inlet pressure is prevented from exceeding e.g. 12.5 $kg/cm^2$ and the pressure of the refrigerant passing the evaporator 4 is limited to this pressure value. This means automatically that the pressure resistance of the evaporator can be set to an ordinary level, since extraordinary pressure relationships will be reliably suppressed.

In parallel with regulator 20 a leak passage 15 is provided. Leak passage 15 has a small cross-sectional area, compared with the cross-sectional area of heating-mode passage 11, etc. Even when regulator 20 is closed, a very small amount of refrigerant is allowed to pass through heating-mode passage 11 and thus the refrigerant line is not completely blocked. Accordingly, when the amount of the circulated refrigerant is very small, a pressure drop occurs.

For normal cooling mode the line switching valve 8 directs all of the high-pressure refrigerant discharged from compressor 1 to condenser 2. The electromagnetic on-off valve 40 then is open. The evaporator 4 inside the vehicle compartment performs its intended function so that a cooling effect is achieved by exchange of heat between the ambient air and the refrigerant in the evaporator 4.

For the auxiliary heating mode the line switching valve 8 is switched to direct all of the high-pressure refrigerant discharged from the compressor 1 into by-pass line 5 and to the evaporator 4 to be returned to compressor 1 via accumulator 6. Electromagnetic on-off valve 40 then is closed.

Consequently, when the refrigerant, the pressure of which has been reduced due to expansion while passing through the by-pass line, also passes through evaporator 4 heat exchange takes place during which the sensible or sufficient amount of heat added by the compressor 1 is removed from the refrigerant. The evaporator 4 now functions as a radiator for heating. Also heat transferred in heat exchanger 14 to the refrigerant is utilised for heating. The refrigerant pressure at the outlet of evaporator 4 is controlled to a fixed level by regulator 20.

Figure 2:
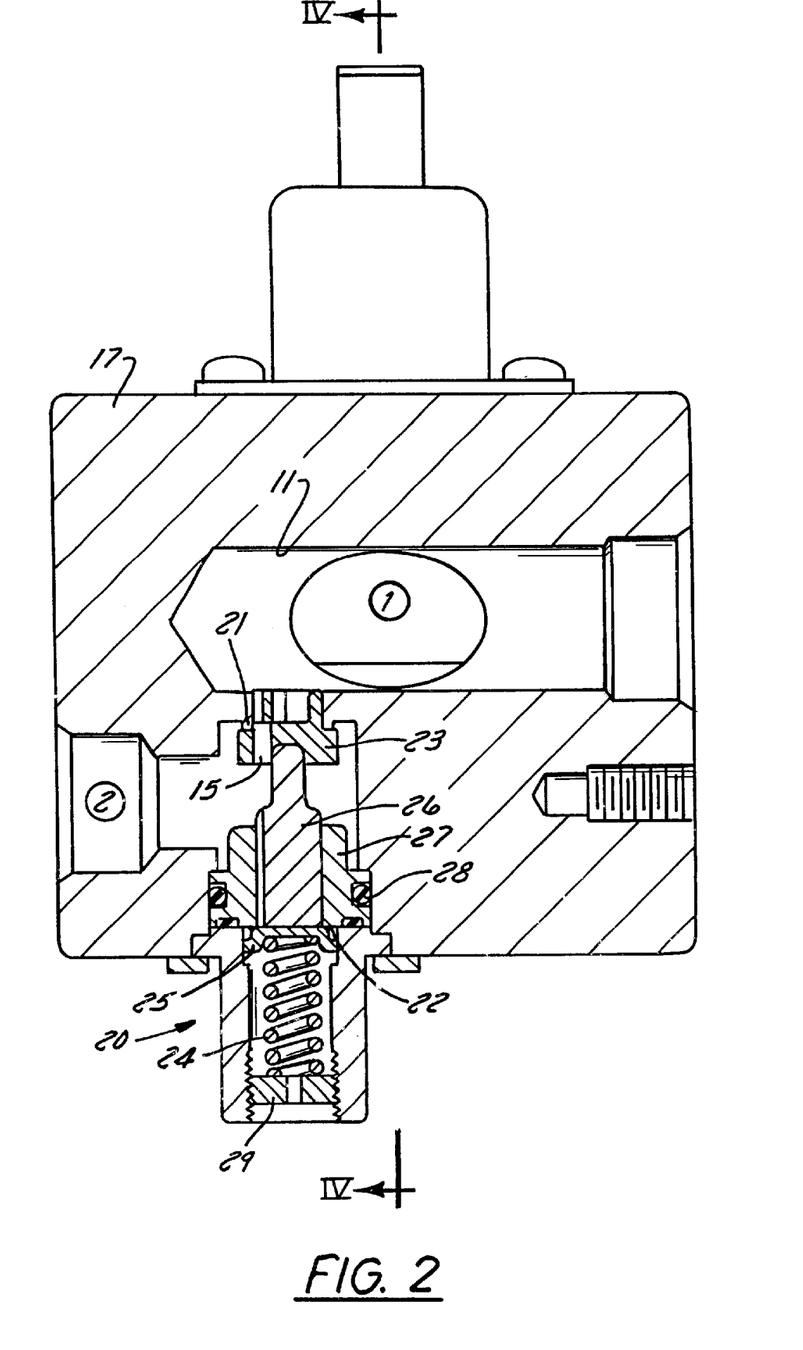

FIG. 2 shows regulator 20 in a mounting block 17 containing heating mode-passage 11. Positions indicated at ①, ② and ③ correspond to those appearing in FIGS. 1 and 4. The upstream branching portion from which the heating and cooling-mode passages 11 and 12 branch off is constituted by a hole cut in a side wall of heating-mode passage 11.

In heating-mode passage 11, which e.g. has a bent form, a valve seat 21 of the regulator 20 is formed. Into said valve seat 21 a leg portion of a valve element 23 is loosely inserted. In this embodiment the leak passage 15 is formed in valve element 23.

Valve element 23 is biased in closing direction towards valve seat 21 by a compression coil spring 24. The value of the inlet pressure of the regulator at which valve element 23 starts to clear main valve seat 21 is set by the pre-load of compression coil spring 24 hence being decisive for the opening characteristic or pressure controlling characteristic of regulator 20. Compression coil spring 24 is acting against a diaphragm 22 via a spring counterfort 25. Its force is transmitted to valve element 23 via an intermediate rod 26 guided in a sleeve 27 into which intermediate rod 26 is loosely fitted so that pressure is transmitted to diaphragm 22 past rod 26. O-ring 28 has the purpose of sealing this section. An adjusting nut or spring counterfort 29 allows to adjust the force of compression coil spring 24.

The effective pressure-receiving area of valve element 23 is selected to be equal to that of diaphragm 22 in order to balance any influence of the pressure of the refrigerant present between valve element 23 and diaphragm 22.

FIG. 2 shows a fully closed state of regulator 20.

Figure 3:
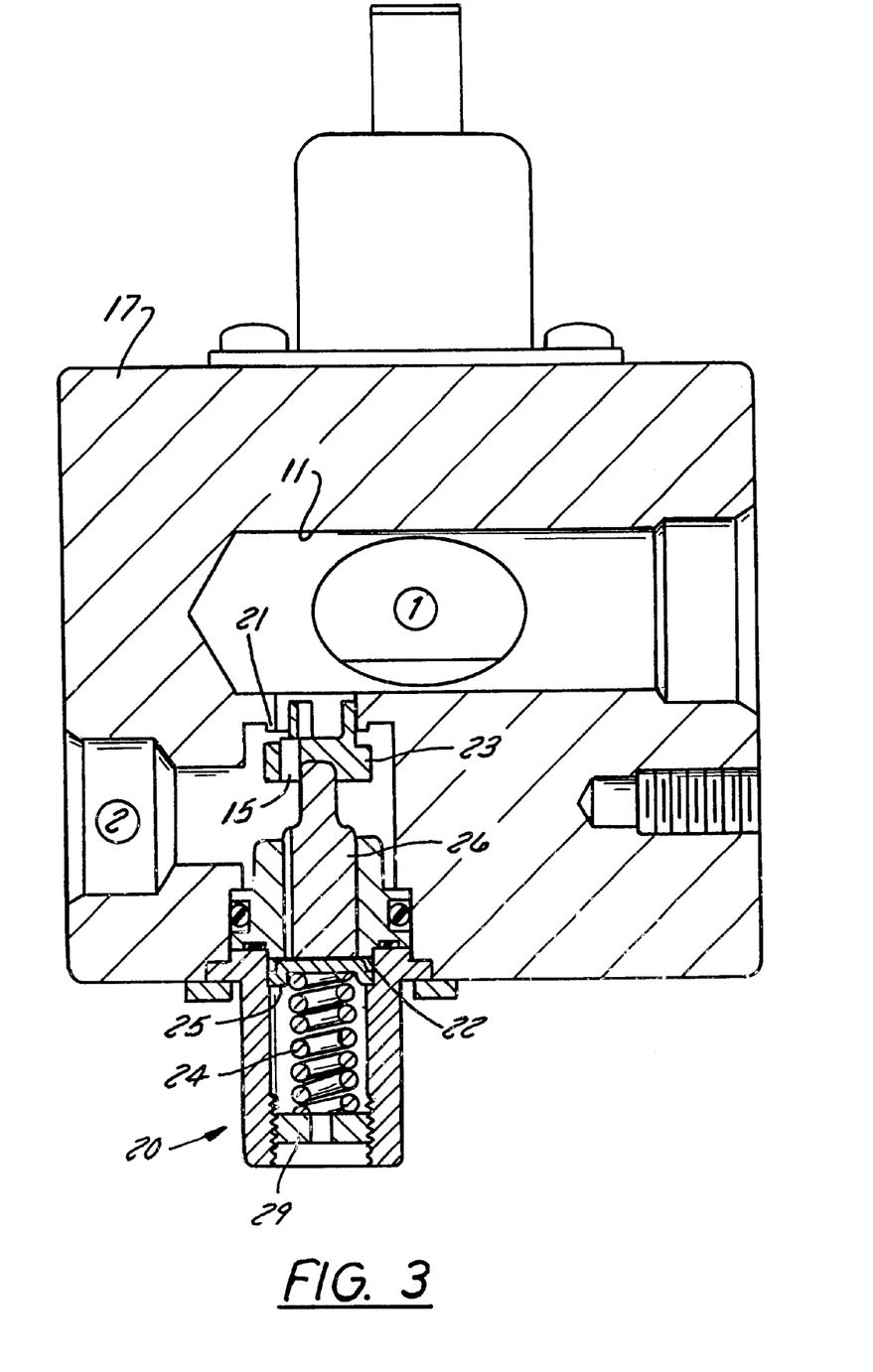

FIG. 3 shows an open state of regulator 20 with valve element 23 separated from valve seat 21 due to the tendency of the inlet pressure to exceed a predetermined minimum pressure value. In this state the inlet pressure of regulator 20, i.e. the outlet pressure of the evaporator 4, is controlled to the predetermined minimum pressure as set by compression coil spring 24.

Figure 4:
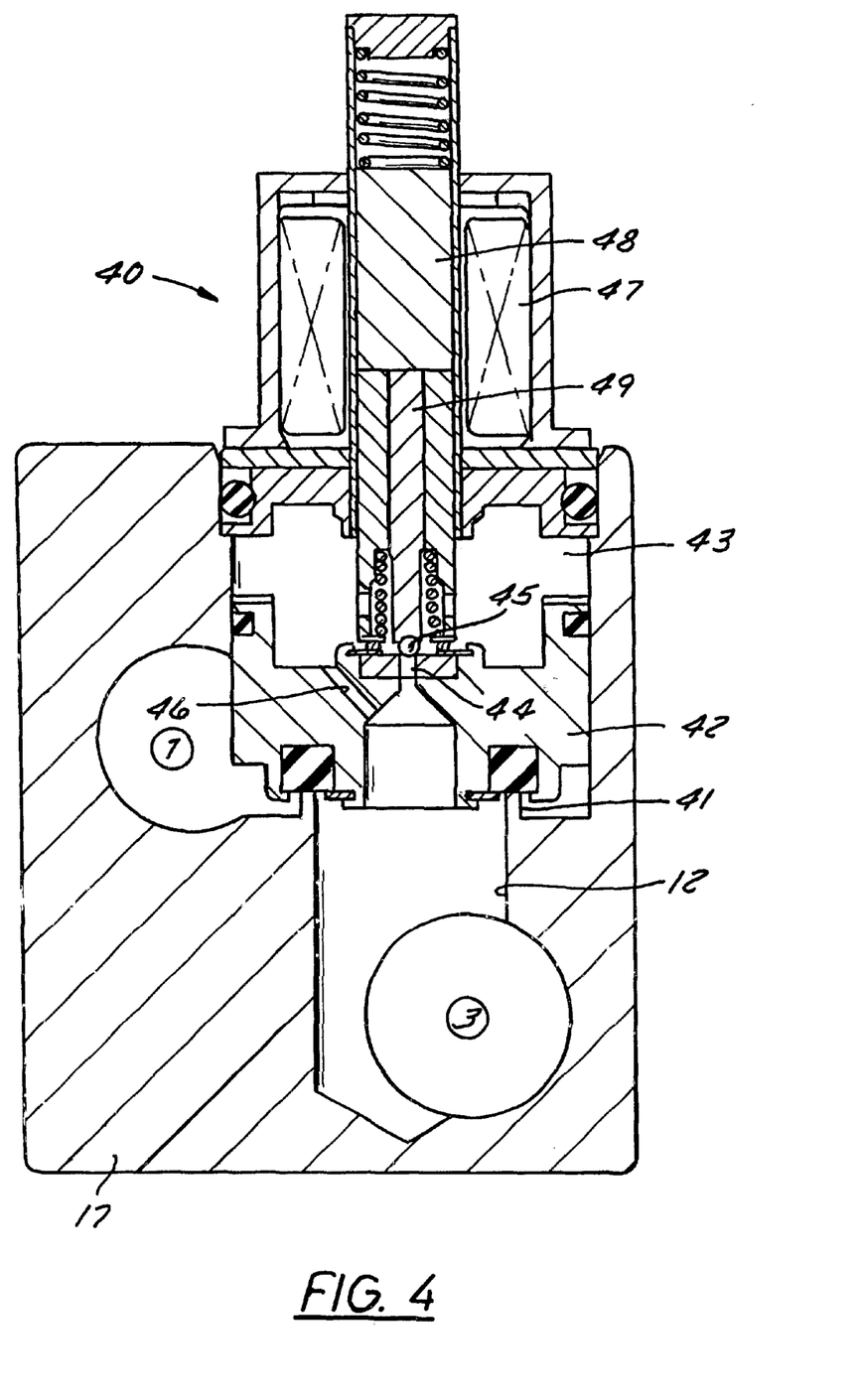

FIG. 4 is a sectional view in plane IV—IV in FIG. 2 of electromagnetic on-off valve 40 also provided within mounting block 17. Said on-off valve 40 comprises a pilot-operated electromagnetic valve (pilot valve 44, 45; main valve 41, 42 controlled by pilot valve 44, 45) and is equipped with a coil 47, a moveable iron coil 48 and a pilot valve-actuating rod 49.

Above main valve element 42 facing main valve seat 41 from the upstream side a pressure control chamber 43 is defined. Main valve element 42 has a pilot hole 44. As soon as pilot hole 44 is opened, the downstream side of the cooling-mode passage 12 and the pressure control chamber 43 communicate with each other. The open and closed states of pilot valve 44, 45 is controlled by pilot valve member 45. A leak passage 46 having a smaller cross-sectional area than pilot hole 44 maintains a permanent mutual connection between the upstream side of cooling mode passage 12 (upstream of main valve seat 41) and pressure control chamber 43. Leak passage 46 alternatively could be formed by a gap around the outer peripheral surface of main valve element 42.

Figure 5:
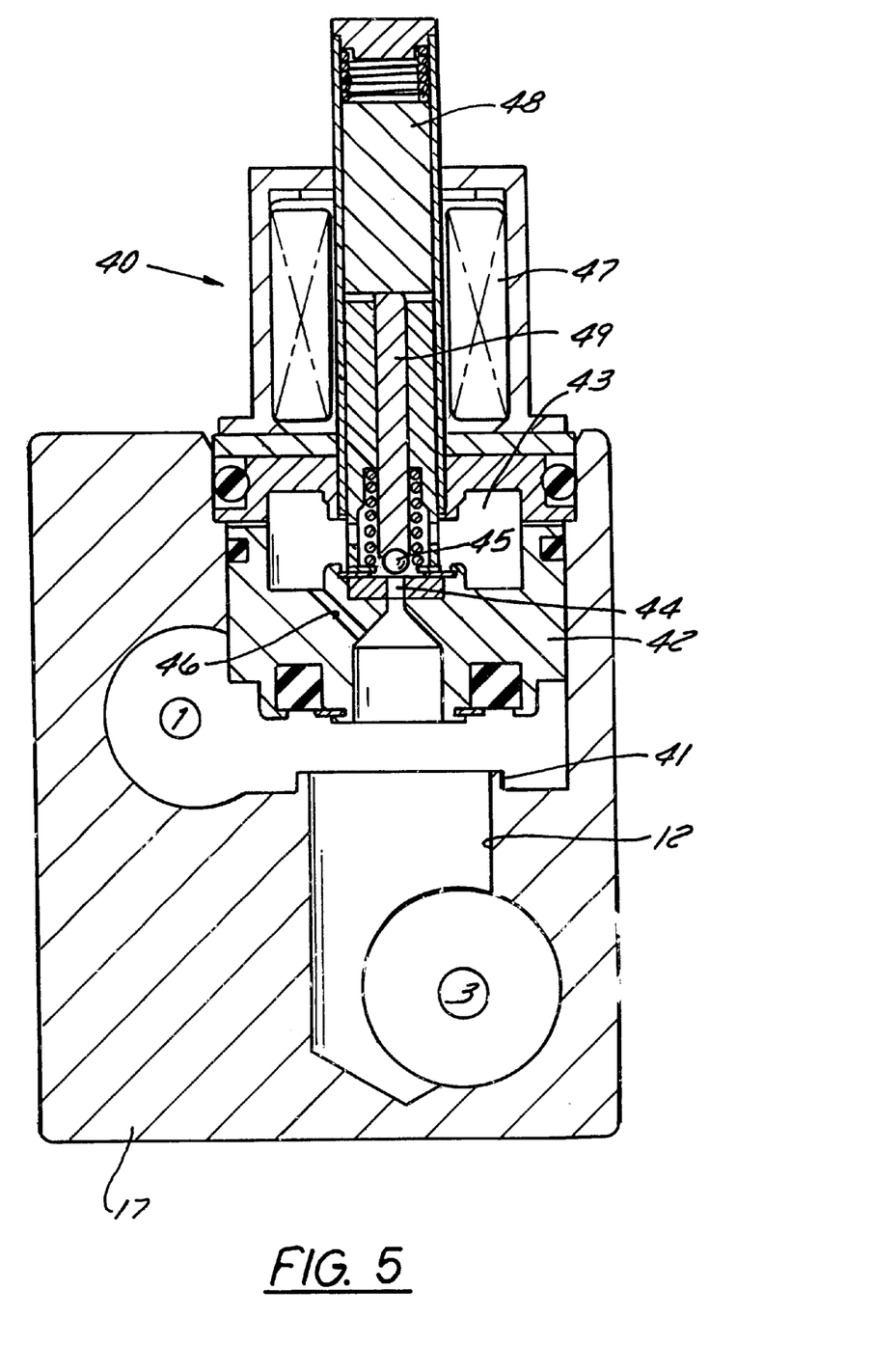

Pilot hole 44 is opened or closed depending on whether coil 47 is energised or deenergised. As long as pilot hole 44 is closed, the pressure in pressure regulating chamber 43 supplied via leakage passage 46 presses main valve element 42 against main valve seat 41 and firmly closes said on-off valve 40. As soon as pilot hole 44 is open the lower pressure at the downstream side of cooling-mode passage 12 allows to lower the pressure inside pressure regulating chamber 43 until the pressure at the upstream side of cooling-mode passage 12 pushes main valve element 42 upwardly and separates it from main valve seat 41. FIG. 4 shows the closed state of on-off valve 40. FIG. 5 shows the open state of on-off valve 40 in which the cooling-mode passage 12 is opened.

Figure 6:
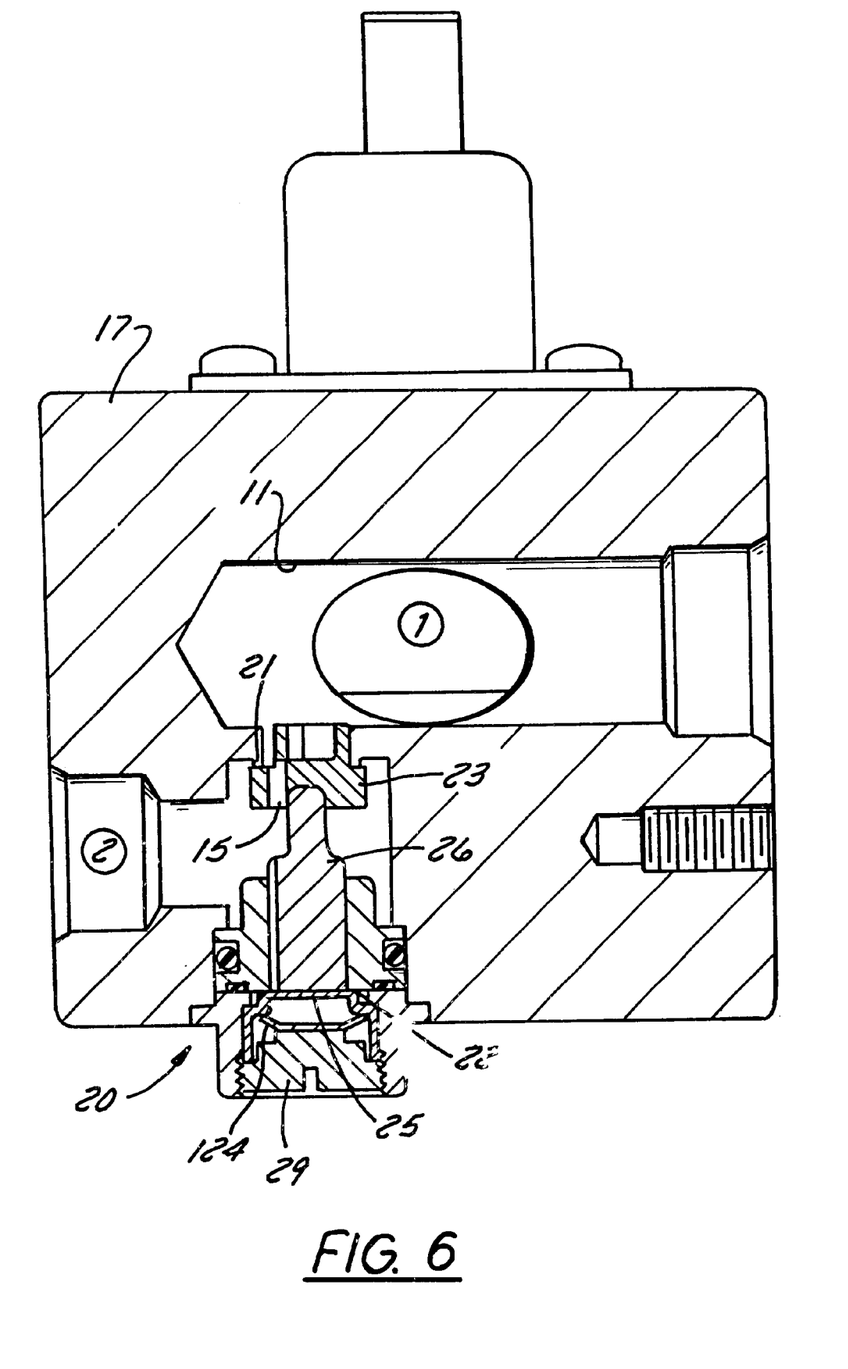
Figure 7:
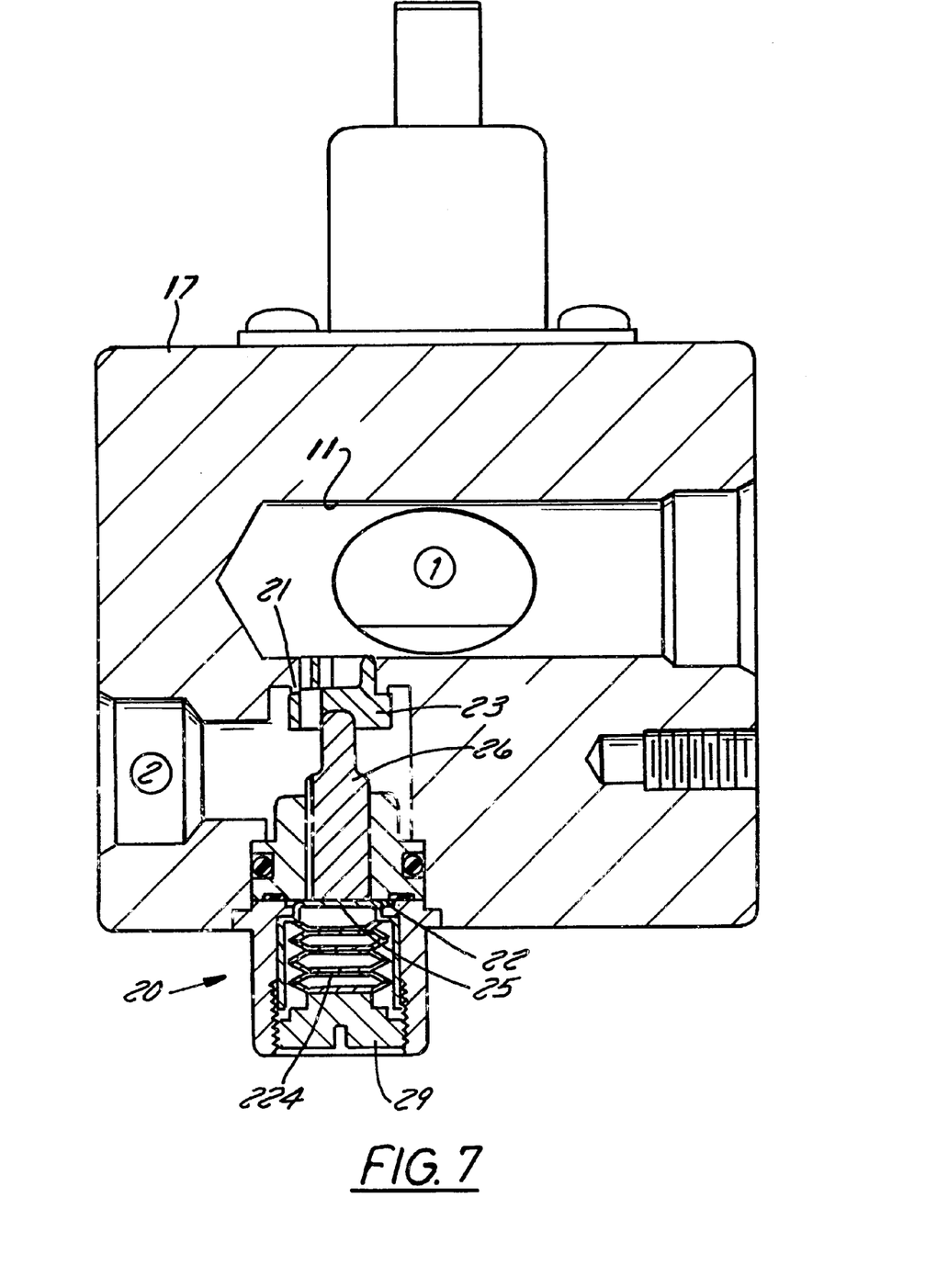
Figure 8:
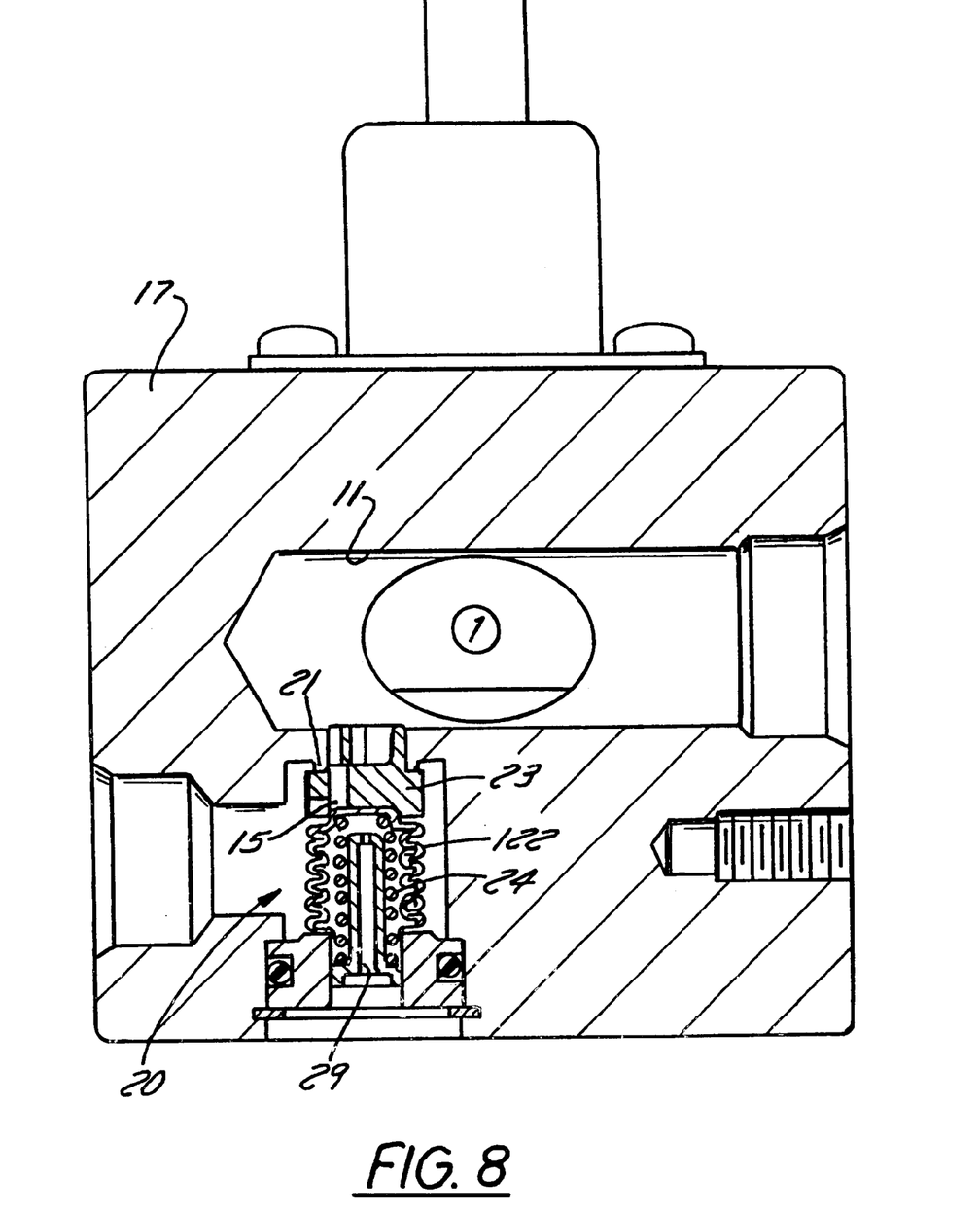

Regulator 20 may in practice may be designed in various ways. In place of the compression coil spring 24, e.g. one or more disk springs 124, 224 may be used (FIGS. 6 and 7), and instead of diaphragm 22 a bellows 122 may be used in connection with compression coil spring 24 as in FIG. 8.

Figure 9:
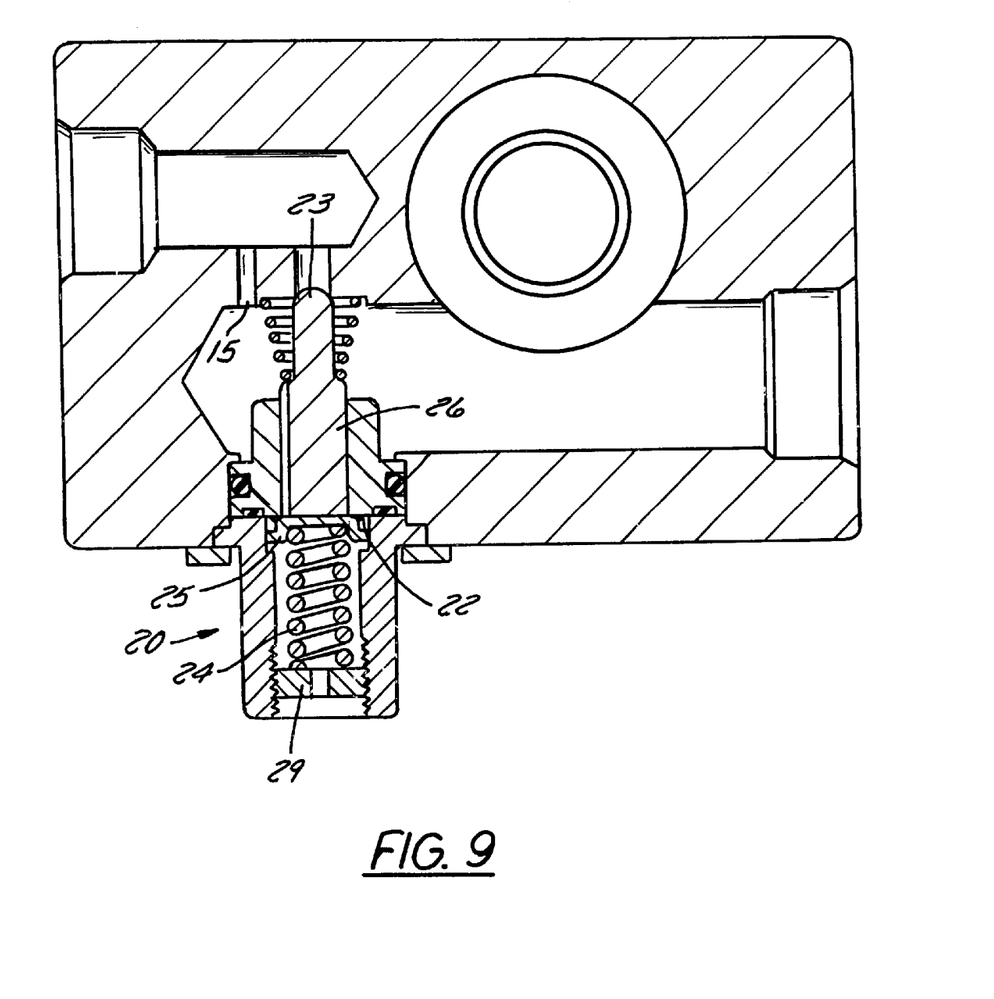

In another embodiment in FIG. 9 the effective pressure-receiving area of valve element 23 is much smaller (e.g. about 1/10 of than the effective pressure receiving area of the diaphragm 22 or the bellows 122 so that the pressure of the refrigerant present between valve element 23 and diaphragm 22 or the bellows 122 can be substantially cancelled in its influence on the operating behaviour of the regulator. As a further alternative leak passage 15 may be formed in mounting block 17 parallel to valve seat 21.

Figure 10:
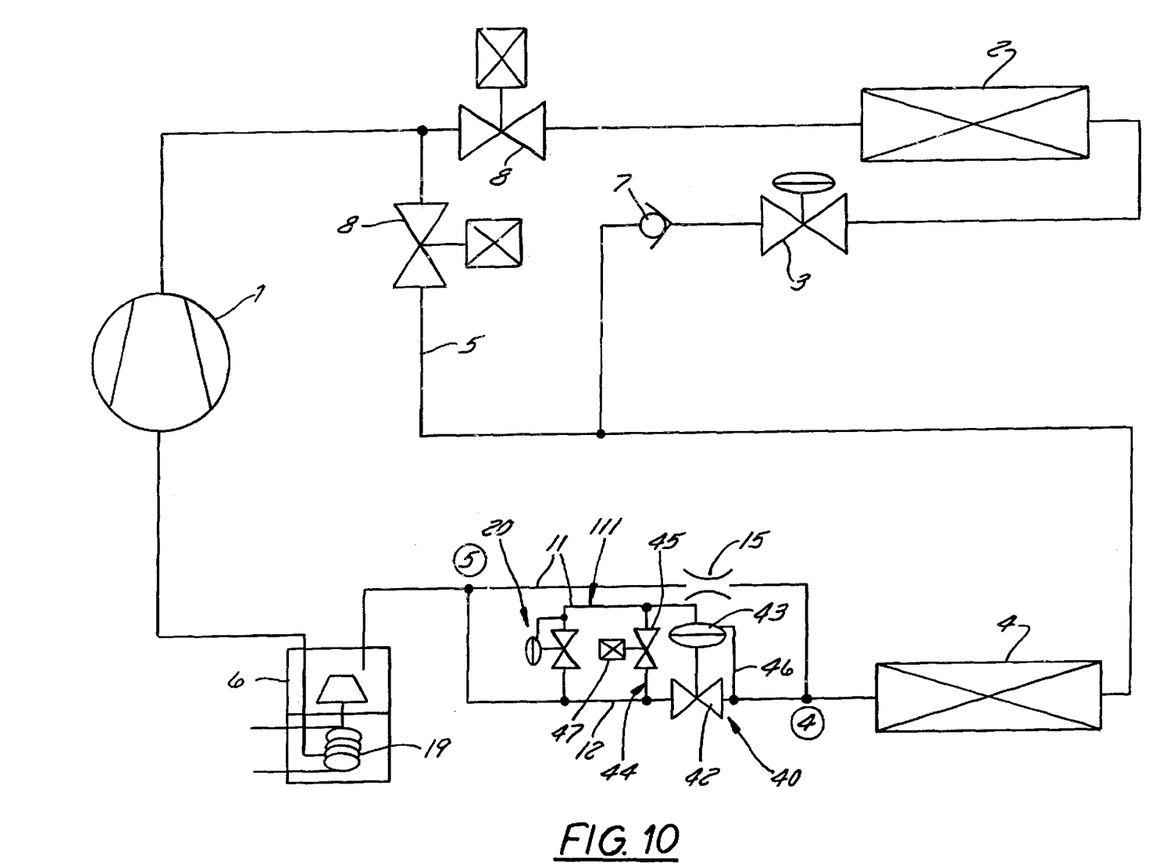

In the second embodiment of the refrigerating cycle in FIG. 10 instead of heat exchanger 14 shown in FIG. 1 a heat exchanger 19 for exchanging heat released from the engine or motor, battery or like of the automobile, with the refrigerant, is provided inside accumulator 6. Heat transferred to the refrigerant by heat exchanger 19 within accumulator 6 can be employed for heating purposes in evaporator 4.

Furthermore, in this embodiment regulator 20 is provided between the outlet of and the pressure control chamber 43 of the electromagnetic on-off valve 40. A communication passage 111 communicating the regulator 20 with pressure control chamber 43 serves as a section of the heating-mode passage 11 when regulator 20 is in its open state. Leak passage 15 is formed in parallel with those elements in order to permanently connect the evaporator 4 and the accumulator 6.

Figure 11:
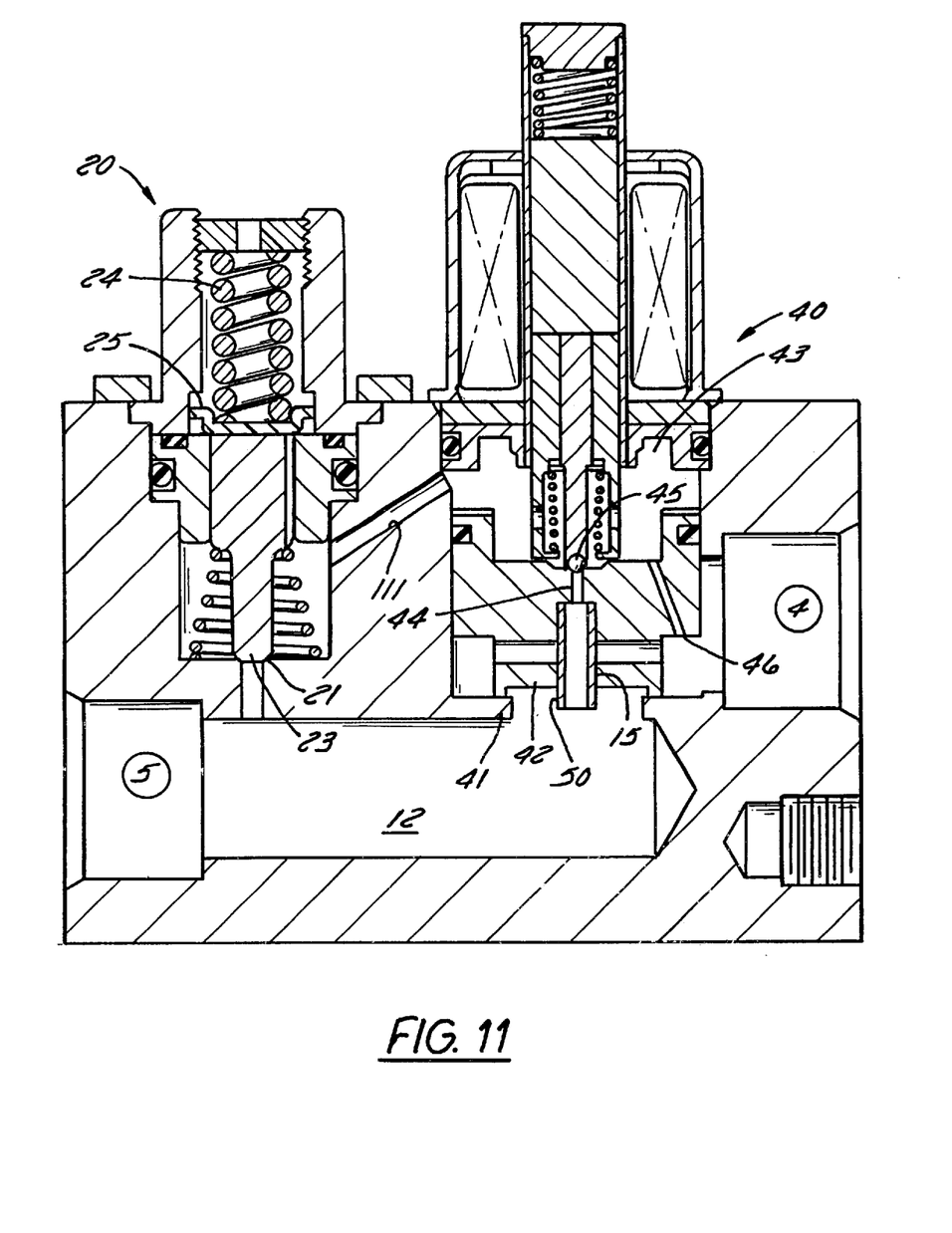

FIG. 11 illustrates in a sectional view a specific arrangement with on-off valve 40 and regulator 20 within common block 17 as a further embodiment. Leak passage 15 here is formed by a gap around the outer peripheral surface of a pipe member 50 fitted into an inlet portion of pilot hole 44 of on-off valve 40. Having leak passage formed with an annular shape reduces noise generation by the passing refrigerant.

Regulator 20 is situated in common block 17 between pressure regulating chamber 43 of on-off valve 40 and cooling-mode passage 12. Passage 111 connects pressure control chamber 43 and a chamber containing valve member 23 of regulator 20. Between said chamber and cooling-mode passage 12 valve seat 21 is provided. In the heating mode (on-off valve 40 closed) the outlet of the evaporator 4 is connected to the inlet of accumulator 6 by the heating-mode passage 11 defined by leakage passage 46 in on-off valve 40, pressure regulating chamber 43, passage 111 and valve seat 21, and simultaneously by leakage passage 15.

What is claimed is:

1. A refrigerating cycle, having a main line and a by-pass line, a compressor, a condenser in said main line downstream the compressor, an evaporator downstream said condenser, an accumulator between said evaporator and said compressor, at least one expansion valve means for adiabatically expanding a refrigerant, and refrigerant flow switching means for selectively supplying the refrigerant in a cooling mode to said condenser and in a heating mode to said by-pass line, wherein said accumulator is designed as a refrigerant-amount-controlling means for the refrigerant-amount passing said by-pass line in the heating mode, wherein an evaporator-outlet-pressure regulator is provided between the outlet of the evaporator and an inlet of the accumulator for controlling the outlet pressure of the evaporator within a limited pressure range, and wherein a by-pass cooling mode passage is by-passing regulator and is connecting the outlet of the evaporator directly to the inlet of the accumulator, and wherein a by-pass passage on-off valve for opening/closing said by-pass cooling mode passage is provided along said by-pass cooling mode passage.

2. Refrigerating cycle as in claim 1, wherein the regulator controls its inlet pressure such that the inlet pressure is kept at a fixed pressure value or somewhat higher.

3. Refrigerating cycle as in claim 1, wherein the regulator controls its inlet pressure such that the inlet pressure is kept at a fixed pressure value or lower.

4. Refrigerating cycle as in claim 1, wherein said regulator comprises a pressure limiting main valve responsive to the value of the inlet pressure of the pressure limiting main valve and/or the outlet pressure of the evaporator by opening and closing a valve seat situated in a heating mode line connecting said evaporator and said accumulator.

5. Refrigerating cycle as in claim 4, wherein said pressure limiting valve has a pre-set pressure controlling characteristic for automatically controlling the inlet pressure within a pressure range at least limited by a fixed minimum pressure value or by a fixed maximum pressure value.

6. Refrigerating cycle as in claim 5, wherein said pressure range includes an inlet pressure variation of about 0.2 to 1.5%, preferably about 0.4 to 1.0%; respectively, above said minimum pressure or below said maximum pressure, respectively, and wherein an initial value of the inlet pressure within said pressure range is depending from fully closed and fully opened states of said pressure limiting valve and of a spring assembly biasing said pressure limiting valve in closing direction.

7. Refrigerating cycle as in claim 1, wherein said regulator comprises a pressure limiting valve controlling its own inlet pressure such that in case of a pressure drop the inlet pressure is kept at a fixed minimum pressure according to a fully closed state of said main valve or is allowed to vary between said fixed minimum pressure and a somewhat higher pressure value according to a fully opened state of said main valve in case of a tendency of a pressure rise.

8. Refrigerating cycle as in claim 1, wherein said regulator comprises a pressure limiting valve controlling its own inlet pressure such that in case of a tendency of a pressure rise the inlet pressure is kept at a fixed maximum pressure according to fully a opened state of said valve or is allowed to vary between said fixed maximum pressure and a somewhat lower pressure value according a fully closed state of said main valve in case of the tendency of a pressure drop.

9. Refrigerating cycle as in claim 1, wherein said regulator resiliently is biased in closing direction by a coil spring assembly, or a disk spring assembly, via a diaphragm hermetically separating the respective spring assembly or by a bellows assembly.

10. Refrigerating cycle as in claim 1, wherein a leak passage with a small cross-sectional area is formed in parallel with said regulator said leak passage by-passing said regulator and interconnecting said evaporator and said accumulator directly.

11. Refrigerating cycle as in claim 1, wherein said regulator and said by-pass cooling mode passage on-off valve are provided in a common valve box.

12. Refrigerating cycle as in claim 1, wherein said on-off valve comprises a pilot operated electromagnetic valve having a pressure control chamber and an outlet in said by-pass cooling mode passage, and wherein said regulator is inserted between said pressure control chamber and said outlet of said on-off valve.

\* \* \* \* \*